(12) United States Patent  
Ecker

(10) Patent No.: US 8,415,970 B1
(45) Date of Patent: Apr. 9, 2013

(54) METHOD AND APPARATUS FOR REDUCING CROSSTALK EFFECTS

(75) Inventor: Reuven Ecker, Haifa (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 0 days.

(21) Appl. No.: 13/364,449

(22) Filed: Feb. 2, 2012

Related U.S. Application Data

(60) Provisional application No. 61/441,606, filed on Feb. 10, 2011.

(51) Int. Cl.
*H03K 17/16* (2006.01)
(52) U.S. Cl. .............................. 326/26; 326/82; 326/28
(58) Field of Classification Search ............... 326/26, 326/27, 82, 83, 86
See application file for complete search history.

(56) References Cited

U.S. PATENT DOCUMENTS

| | | | |
|---|---|---|---|
| 7,456,655 B1 | 11/2008 | Ben Artsi | |
| 7,477,068 B2* | 1/2009 | Truong et al. | 326/27 |
| 7,620,920 B2* | 11/2009 | Wang et al. | 716/113 |
| 7,764,083 B2* | 7/2010 | Broyde et al. | 326/30 |
| 2005/0259692 A1* | 11/2005 | Zerbe | 370/503 |
| 2008/0143375 A1* | 6/2008 | Truong et al. | 326/26 |
| 2010/0272216 A1* | 10/2010 | Liebowitz et al. | 375/316 |
| 2011/0128971 A1* | 6/2011 | Do | 370/464 |
| 2011/0158011 A1* | 6/2011 | Oh et al. | 365/194 |

* cited by examiner

*Primary Examiner* — Don Le

(57) ABSTRACT

Aspects of the disclosure provide a method for reducing crosstalk effects. The method includes tracking data for output onto at least a first transmission line and a second transmission line, determining a combined pattern in a first signal and a second signal to be respectively transmitted by the first transmission line and the second transmission line, and setting a delay to transmit at least one of the first signal and the second signal as a function of the combined pattern.

20 Claims, 3 Drawing Sheets

METHOD AND APPARATUS FOR REDUCING CROSSTALK EFFECTS

INCORPORATION BY REFERENCE

This present disclosure claims the benefit of U.S. Provisional Application No. 61/441,606, "Minimization of Crosstalk Effects in High Speed Parallel Interfaces" filed on Feb. 10, 2011, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A system often includes two or more circuits coupled together, and a relatively large number of signals are transmitted between the two or more circuits. In an example, a processor chip and a memory chip are assembled on a printed circuit board (PCB). The processor chip and the memory chip are coupled together by conductive materials, such as copper wires, solder bonds, and the like, that form transmitting lines to transmit, for example, control signals, status signals, address signals and data signals between the two chips. When two transmitting lines are located in close proximity to each other, a signal transmitted in one transmitting line can be affected by another signal transmitted in the other transmitting line.

SUMMARY

Aspects of the disclosure provide a method for reducing crosstalk effects. The method includes tracking data for output onto at least a first transmission line and a second transmission line, determining a combined pattern in a first signal and a second signal to be respectively transmitted by the first transmission line and the second transmission line, and setting a delay to transmit at least one of the first signal and the second signal as a function of the combined pattern.

To determine the combined pattern in the first signal and the second signal to be respectively transmitted by the first transmission line and the second transmission line, in an example, the method includes determining a combined switch pattern in the first signal and the second signal.

According to an aspect of the disclosure, the method includes receiving a coupling characteristic of the first transmission line and the second transmission line that is indicative of one of a mutual inductive coupling characteristic and a mutual capacitive coupling characteristic. Further, in an embodiment, the method includes setting the delay as a function of the combined pattern and the coupling characteristic. In an example, the method includes detecting the combined pattern that the coupling characteristic causes a timing change of the combined pattern during transmission. Then, the method includes setting the delay for transmitting the combined pattern to compensate for the timing change.

In an embodiment, the method includes periodically tuning the delay. In an example, the method includes tracking the first signal and the second signal to be transmitted to the first transmission line and the second transmission line. Further, the method includes detecting a first pattern of the first signal and a second pattern of the second signal, and determining a combined pattern defined by a combination of the first pattern and the second pattern.

Aspects of the disclosure provide an integrated circuit (IC) chip. The IC chip includes internal circuits configured to generate data for output onto at least a first transmission line and a second transmission line. Further, the IC chip includes a first interface unit coupled to the first transmission line, a second interface unit coupled to the second transmission line, and a delay controller. The first interface unit is configured to delay a first output signal by a first tunable delay and drive the delayed first output signal on the first transmission line. The second interface unit is configured to delay a second output signal by a second tunable delay and drive the delayed second output signal on the second transmission line. The delay controller is configured to track the data for output, determine a combined pattern in the first output signal and the second output signal, and set a delay of at least one of the first interface unit and the second interface as a function of the combined pattern.

In an embodiment, the first interface unit includes a first tunable delay element, the second interface unit includes a second tunable delay element, and the delay controller is configured to control the first tunable delay element and the second tunable delay element.

According to an aspect of the disclosure, the internal circuits include a data flow circuit configured to generate the first output signal and the second output signal based on the data for output. In parallel to the operation of the data flow circuit, the delay controller determines delays for transmitting the first output signal and the second output signal based on the data for output.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
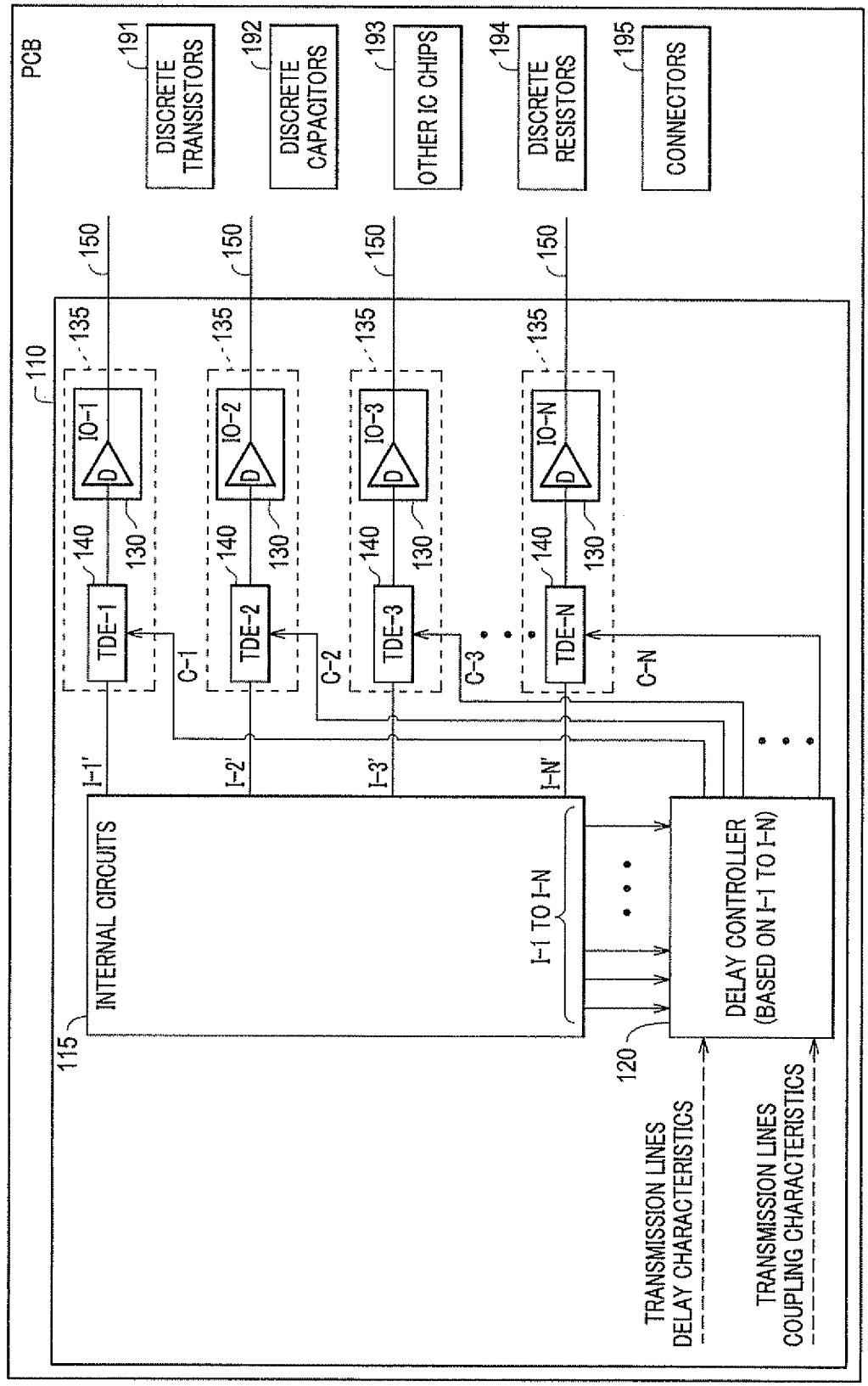
FIG. 1 shows a block diagram of a printed circuit board (PCB) 100 according to the disclosure.

FIG. 1 shows a block diagram of a printed circuit board (PCB) 100 according to the disclosure. The PCB 100 includes an integrated circuit (IC) chip 110, and transmission lines 150. These elements are coupled together as shown in FIG. 1. It is noted that the PCB 100 can include more than one IC chip, such as other IC chips 193, and can include other devices, such as discrete transistors 191, discrete capacitors 192, discrete resistors 194, connectors 195, and the like.

The transmission lines 150 can transmit signals between the IC chip 110 and other devices, for example. The other devices can be situated on the PCB 100, or can be situated off the PCB 100, for example on another PCB. The transmission lines 150 generally include a plurality of sections of conductive components. In an example, a transmission line 150 includes a bond pad on the IC chip 110, a solder bump (not shown) configured to connect the bond pad to a package substrate (not shown), a solder ball (not shown) configured to connect the package substrate to a metal land on the PCB 100, a wire in the package substrate configured to connect the solder bump with the solder ball, a printed metal line in a layer of the PCB 100, a via that connects the metal land to the printed metal line, and the like.

Due to various reasons, such as space limitation, routing complexity, and the like, a transmission line 150, or a portion of the transmission line 150 can be located in a close proximity to another transmission line 150. The transmission lines 150 in the close proximity can induce parasitic coupling effect that a signal transmitted in one of the transmission line 150 can affect another signal transmitted in the other transmission line 150. It is noted that the parasitic coupling effect includes parasitic mutual inductive coupling and parasitic mutual capacitive coupling. The parasitic mutual inductive coupling and the parasitic mutual capacitive coupling affect signals transmissions differently.

In a parasitic mutual inductive coupling example, when a first conductive component transmits a first electrical signal, an electromagnetic field surrounding the first conductive component is created. The electromagnetic field interferes a second electrical signal transmitted by a second conductive component located in a relatively close proximity to the first conductive component, and induces noise in the second electrical signal. In an example, when both the first electrical signal and the second electrical signal switch in the same direction, the switching in the first electrical signal negatively affects the switching rate in the second electrical signal.

Further, in a parasitic mutual capacitive coupling example, the parasitic coupling effect between a first conductive component and a second conductive component located in the close proximity is parasitic mutual capacitive coupling, then a voltage change of a first electrical signal transmitted in the first conductive component can induce a voltage change in the same direction to a second electrical signal transmitted in the second conductive component.

Generally, the induced noise due to the parasitic coupling effect is referred to as crosstalk. According to an aspect of the disclosure, crosstalk is a function of distance. When two conductive components are located in a relatively close proximity, the crosstalk between two signals transmitted by the two conductive components is relatively large; and when two conductive components are far away from each other, the crosstalk between two signals transmitted by the two conductive components is relatively small.

According to another aspect of the disclosure, crosstalk depends on the electrical signals transmitted in the conductive components. In an embodiment, when an electrical signal changes value, for example, from a relatively high voltage to a relatively low voltage or from a relatively low voltage to a relatively high voltage, crosstalk is induced. When the electrical signal is relatively constant, zero crosstalk is induced.

According to another aspect of the disclosure, crosstalk effect depends on a combination of the coupling characteristic and switch patterns of the electrical signals. In an example of parasitic mutual inductive coupling, when a first electrical signal and a second electrical signal switch in the same direction, such as from a relatively high voltage to a relatively low voltage, or from a relatively low voltage to a relatively high voltage, crosstalk induced by the switching of first electrical signal causes the second electrical signal to switch slower; and when the first electrical signal and the second electrical signal switch in the opposite direction, crosstalk induced by the switching of the first electrical signal causes the second electrical signal to switch faster.

In an example of parasitic mutual capacitive coupling, when a first electrical signal and a second electrical signal switch in the same direction, such as from a relatively high voltage to a relatively low voltage, or from a relatively low voltage to a relatively high voltage, crosstalk induced by the switching of first electrical signal causes the second electrical signal to switch faster; and when the first electrical signal and the second electrical signal switch in the opposite direction, crosstalk induced by the switching of the first electrical signal causes the second electrical signal to switch slower.

It is noted that when crosstalk affects switching rate, the crosstalk induces time jitter. The time jitter varies opening and closing of data eyes, and can cause close of effective data eye, and thus can cause transmission errors.

According to an embodiment of the disclosure, the IC chip 110 is configured to adjust timings for transmitting parallel signals out of the IC chip 110 based on data patterns of the parallel signals, to compensate for the crosstalk induced switching rate change.

In the FIG. 1 example, the IC chip 110 includes internal circuits 115, N interface units 135 (N is a positive integer), and a delay controller 120. In an embodiment, an interface unit 135 is an input/output unit that can be configured as an output unit to drive an output signal out of the IC chip 110 onto a coupled transmission line 150, and can be configured as an input unit to receive an input signal coming into the IC chip 110. For simplicity, the interface units 135 are shown as output units in FIG. 1.

In an embodiment, each interface unit 135 includes a tunable delay element (TDE) 140 with a tunable delay and an output driver 130. The delay controller 120 provides delay control signals C-1 to C-N to the TDEs 140. In an example, the control signals C-1 to C-N are digital signals, and the TDEs 140 are digitally controllable. In an example, when the interface unit 135 is configured as an output unit, the TDE 140 delays the transmission of the output signal, and the output driver 130 drives the delayed output signal onto the coupled transmission line 150.

In an embodiment, the internal circuits 115 generate output data, such as I-1 to I-N. Further, the internal circuits 115 includes a data flow circuit (not shown) to suitably prepare I-1' to I-N' corresponding to the output data I-1 to I-N, and provides I-1' to I-N' to the interface units 135. In an example, the data flow circuit takes couple of clock cycles to prepare I-1' to I-N'. In an embodiment, during the couple of clock cycles, the delay controller 120 determines delay adjustments for the TDE 140 based on the output signal I-11 to I-N. It is noted that, in an embodiment, the output data I-1 to I-N are the same as the output signals I-1' to I-N'; and in another embodiment, the output data I-1 to I-N are different from the output signals I-1' to I-N', but can be suitably converted to the output signals I-1' to I-N' for transmission purpose, in an example. In another embodiment, the output data and the output signals use different data representation formats.

According to an embodiment of the disclosure, the delay controller 120 keeps track of the output data I-1 to I-N to detect specific patterns. In an embodiment, the specific patterns are predetermined that crosstalk due to the specific pattern induces time jitter that cause closing of data eye. In an example, the specific patterns are combined switch patterns for at least two outputs, such as switching in the same direction in the same clock cycle by the two outputs, switching in the opposite direction in the same clock cycle by the two outputs, and the like. The delay controller 120 then determines delay adjustments to compensate for the crosstalk effect and then reduces time jitter.

During operation, in an example, the delay controller 120 initializes delays to add to the transmission lines 150. In an embodiment, the PCB 100 is a component in a system. When the system is assembled together, the system is configured in a calibration mode to calibrate transmission lines delay characteristics. In an example, respective delays of the transmission lines 150 are measured based on time domain reflectometer (TDR). The measured delays are provided to the delay controller 120, and the delay controller 120 initializes delays to add to the transmission lines 150 to compensate for the difference of the measured delays.

Then, the delay controller 120 determines coupling characteristic of the transmission lines 150. In an embodiment, the delay controller 120 is aware of the locations of the transmission lines 150, and determines the coupling characteristics based on the locations. In an example, the IC chip outputs eight bits in parallel. The transmission lines 150 corresponding to the eight bits are sequentially placed according to a bit order. Thus, the delay controller 120 determines that the transmission lines corresponding to, for example, adjacent bits, are in close proximity, and have a relatively high mutual coupling.

In another embodiment, the coupling characteristics are provided to the delay controller 120. In an example, the coupling characteristics are pre-calibrated and stored in a memory on the IC chip 110 or off the IC chip 110. Then, the coupling characteristics are suitably provided to the delay controller 120. According to an aspect of the disclosure, the coupling characteristic also indicates whether the mutual coupling is mutual inductive coupling or mutual capacitive coupling.

Further, the delay controller 120 tracks data for output to determine a switch pattern of output signals I-1' to I-N' to be transmitted by the transmission lines 150. In an example, the delay controller 120 determines whether output signals to be transmitted in close proximity switch in a same clock cycle, for example. When the output signals switch in the same clock cycle, the delay controller determines delay adjustments based on the coupling characteristics and the switch pattern to compensate for crosstalk effect.

In an example, when the mutual coupling of a first transmission line 150 and a second transmission line 150 is mutual inductive coupling, crosstalk due to switching in the same direction decreases switching rate, and crosstalk due to switching in the opposite direction increases switching rate. Thus, in an example, the delay controller 120 determines a negative delay adjustment for switching in the same direction and a positive delay adjustment for switching in the opposite direction. In addition, in an example, the delay controller determines different delay adjustments for the first transmission line and the second transmission line, for example, as a function of different intrinsic delay of the two transmission lines.

Further, the delay controller 120 tunes the delays to the transmission lines 150 according to the initial delays and the delay adjustments. For example, the delay controller 120 provides the control signals CA to C-N to the TDEs 140 to tune the delay according to the initial delays and the delay adjustments.

In an embodiment of the disclosure, the delay controller 120 is configured to actively track the output data I-1 to I-N and actively adjust the control signals C-1 to C-N to tune the TDEs 140 to compensate for the crosstalk effect. Then, the TDEs 140 delays the output signals I-1' to I-N' accordingly to reduce time jitter.

Figure 2:
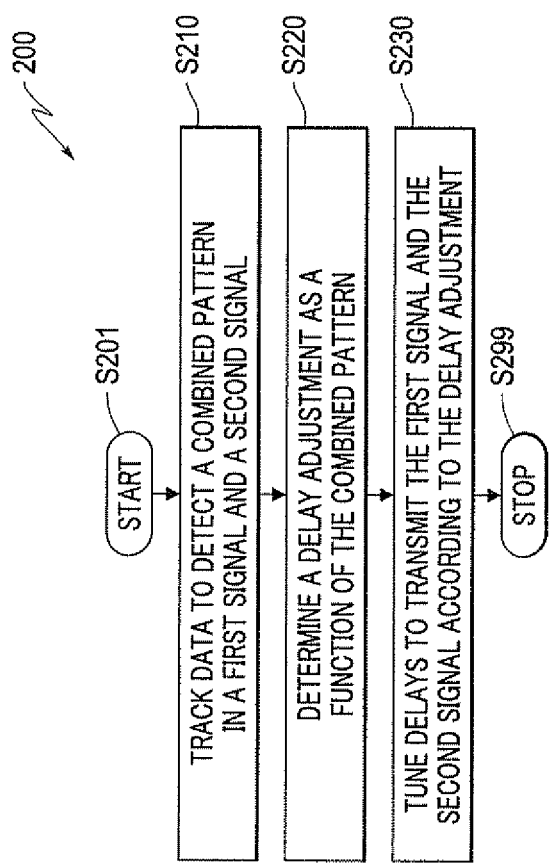
FIG. 2 shows a flow chart outlining a process example 200 according to an embodiment of the disclosure.

FIG. 2 shows a flow chart outlining a process example 200 of a delay controller, such as the delay controller 120, according to an embodiment of the disclosure. The process starts at S201 and proceeds to S210.

At S210, the delay controller tracks data for output to detect a combined pattern in a first signal and a second signal to be transmitted on a first transmission line and a second transmission line. In an embodiment, the delay controller is aware of location information of transmission lines, and determines that at least a portion of the first transmission line is in a close proximity of the second transmission line. In an example, a bump of the first transmission line is adjacent to a bump of the second transmission line on an IC chip. In another embodiment, the delay controller receives transmission lines coupling characteristics, and determines that the mutual coupling of the first transmission line and the second transmission line is larger than a threshold. Then, the delay controller tracks the data for output to the first transmission line and the second transmission line.

According to an embodiment of the disclosure, the delay controller is configured to detect specific combined patterns, such as switching in the same direction, switching in the opposite direction, and the like. In an example, the specific combined patterns are predetermined. In an example, crosstalk effect due to the specific combined patterns can cause time jitter, and affect opening size of data eye. Then, the delay controller detects the predetermined specific combined patterns.

At S220, the delay controller determines a delay adjustment as a function of the combined pattern. According to an aspect of the disclosure, the delay controller also determines the delay adjustment based on the coupling characteristics between the first transmission line and the second transmission line. According to an embodiment of the disclosure, the delay controller is configured to determine the delay adjustment to compensate for the crosstalk and thus maintain the opening size of data eye. In an example, when the mutual coupling between the first transmission line and the second transmission line is mutual capacitive coupling, switching in the same direction increases switching speed, and switching in the opposite direction decreases switching speed. Thus, delay is increased for switching in the same direction, and delay is decreased for switching in the opposite direction.

At S230, the delay controller tunes delays of the first transmission line and the second transmission line according to the delay adjustment. In the FIG. 1 example, the delay controller provides control signals to tunable delay elements in the interface units to adjust the delay. In an embodiment, the tunable delay elements are controlled by digital signals. The delay controller uses digital signal processing techniques to determine the digital signals to control the tunable delay elements. Then, the process proceeds to S299 and terminates.

According to an embodiment of the disclosure, the delay controller can be implemented by various techniques. In an example, the delay controller is implemented as logic circuits to determine a delay adjustment for a signal switching, such as from a high level to a low level, to be transmitted, and set the tunable delay element according to the delay adjustment at the time to transmit the signal switching. Further, in an example, the logic circuits actively tune the tunable delay element, such as periodically, to compensate for crosstalk induced switching rate changes in order to reduce time jitter. It is noted that other suitable implementations are also contemplated.

Figure 3:
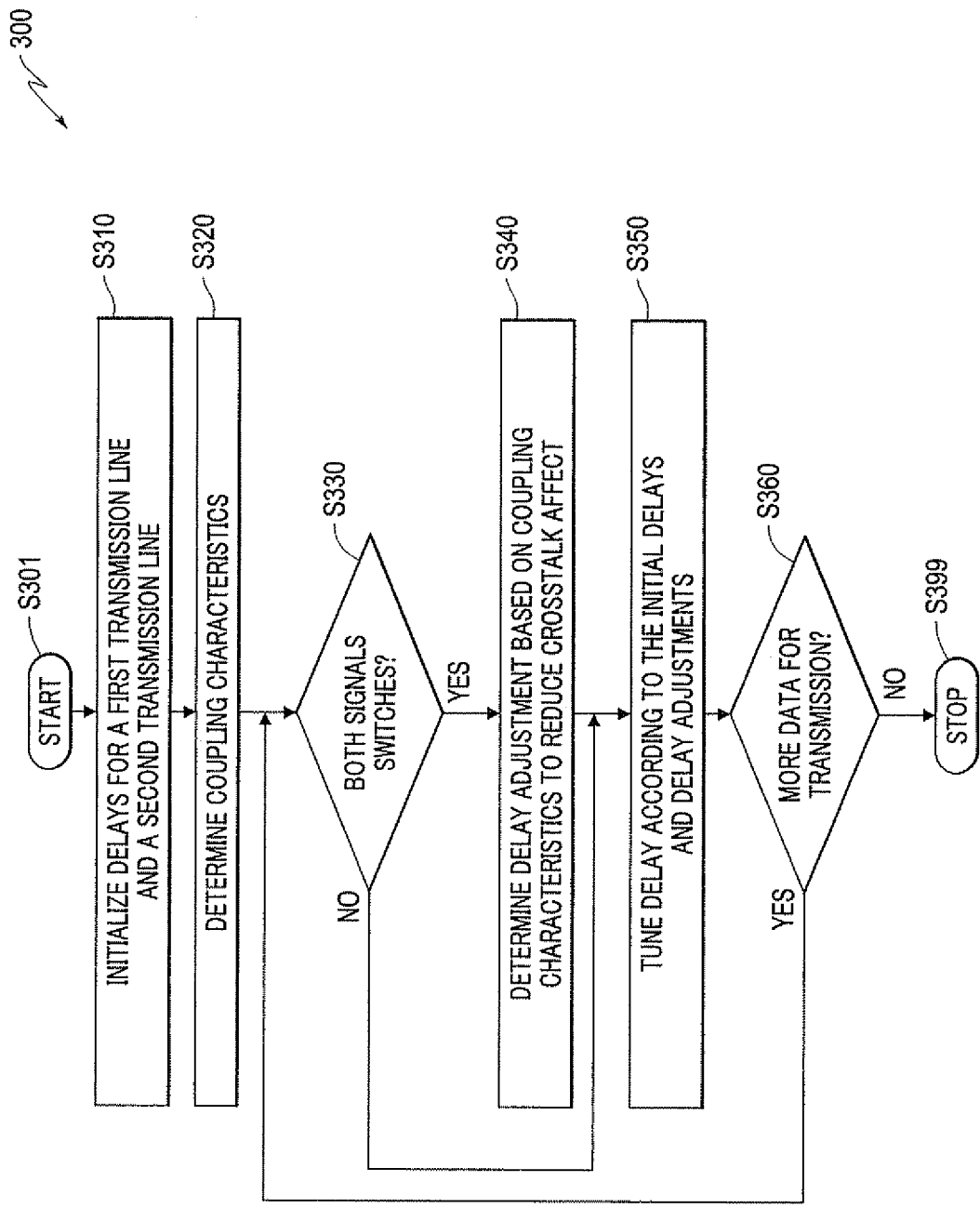
FIG. 3 shows a flow chart outlining another process example 300 according to an embodiment of the disclosure.

FIG. 3 shows a flow chart outlining another process example 300 for a delay controller, such as the delay controller 120, according to an embodiment of the disclosure.

At S310, the delay controller initializes delays to add to a first transmission line and a second transmission line. In an embodiment, after a system including the PCB 100, is assembled together, the system is configured in a calibration mode to calibrate transmission lines delay characteristics. In an example, respective delays of the transmission lines are measured based on time domain reflectometer (TDR). The measured delays are provided to the delay controller, and the delay controller initializes delays to add to the first and the second transmission lines to compensate for the difference of the measured delays.

At S320, the delay controller determines coupling characteristic of the first and second transmission lines. In an embodiment, the delay controller is aware of the locations of the first and second transmission lines, and determines the coupling characteristics based on the locations of the transmission lines. In an example, the IC chip outputs eight bits in parallel. The transmission lines corresponding to the eight bits are placed according to a bit order. Thus, the delay controller determines that the first and second transmission lines corresponding to, for example, adjacent bits, are in close proximity, and have a relatively high mutual coupling.

In another embodiment, the coupling characteristics are provided to the delay controller. In an example, the coupling characteristics are pre-determined or pre-calibrated based on a design of the PCB 100, and coupling characteristics are stored in a memory on the IC chip or off the IC chip. Then, the coupling characteristics are suitably provided to the delay controller. According to an aspect of the disclosure, the coupling characteristic also indicates whether the mutual coupling is mutual inductive coupling or mutual capacitive coupling.

At S330, in an example, the delay controller tracks data for output to determine a switch pattern of two signals to be transmitted by the first and second transmission lines. In an example, the delay controller determines whether both signals switch in a same clock cycle, for example. When both signals switch in the same clock cycle, the process proceeds to S340; otherwise, the process proceeds to S350.

At S340, the delay controller determines a delay adjustment based on the coupling characteristics and the switch pattern to compensate for crosstalk effect. In an example, when the mutual coupling of the first transmission line and the second transmission line is mutual inductive coupling, crosstalk due to switching in the same direction decreases switching rate, and crosstalk due to switching in the opposite direction increases switching rate. Thus, in an example, the delay controller determines a negative delay adjustment for switching in the same direction and a positive delay adjustment for switching in the opposite direction. In addition, in an example, the delay controller determines different delay adjustments for the first transmission line and the second transmission line, for example, as a function of different intrinsic delay of the two transmission lines.

At S350, the delay controller tunes the delays to the first transmission line and the second transmission line according to the initial delays and the delay adjustments.

At S360, the delay controller determines whether there is more data for transmission. When there is more data for transmission, the process returns to S330; otherwise, the process proceeds to S399 and terminates.

According to an embodiment of the disclosure, the delay controller can be implemented by various techniques. In an example, the delay controller is implemented as logic circuits. It is noted that other suitable implementations are also contemplated.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
    tracking data for output onto at least a first transmission line and a second transmission line;
    determining a combined pattern in a first signal and a second signal to be respectively transmitted by the first transmission line and the second transmission line; and
    setting a delay to transmit at least one of the first signal and the second signal as a function of the combined pattern.

2. The method of claim 1, wherein determining the combined pattern in the first signal and the second signal to be respectively transmitted by the first transmission line and the second transmission line further comprises:
    determining a combined switch pattern in the first signal and the second signal.

3. The method of claim 1, further comprising:
    receiving a coupling characteristic of the first transmission line and the second transmission line that is indicative of one of a mutual inductive coupling characteristic and a mutual capacitive coupling characteristic.

4. The method of claim 3, wherein setting the delay to at least one of the first signal and the second signal as a function of the combined pattern further comprises:
    setting the delay as a function of the combined pattern and the coupling characteristic.

5. The method of claim 3, further comprising:
    detecting the combined pattern that the coupling characteristic causes a timing change of the combined pattern during transmission.

6. The method of claim 5, wherein setting the delay as a function of the combined pattern and the coupling characteristic further comprises:
    setting the delay for transmitting the combined pattern to compensate for the timing change.

7. The method of claim 1, further comprising:
    determining that at least a portion of the second transmission line is adjacent to the first transmission line.

8. The method of claim 1, further comprising:
    periodically tuning the delay as a function of combined patterns of the first signal and the second signal.

9. The method of claim 1, wherein tracking the data for output to at least the first transmission line and the second transmission line further comprises:
    tracking the first signal and the second signal to be transmitted to the first transmission line and the second transmission line.

10. The method of claim 9, wherein determining the combined pattern in the first signal and the second signal further comprises:
    detecting a first pattern of the first signal and a second pattern of the second signal; and
    determining a combined pattern defined by a combination of the first pattern and the second pattern.

11. An integrated circuit (IC) chip, comprising:
    internal circuits configured to generate data for output onto at least a first transmission line and a second transmission line;
    a first interface unit coupled to the first transmission line, the first interface unit configured to delay a first output signal by a first tunable delay and drive the delayed first output signal on the first transmission line;
    a second interface unit coupled to the second transmission line, the second interface unit configured to delay a second output signal by a second tunable delay and drive the delayed second output signal on the second transmission line; and a delay controller configured to track the data for output, determine a combined pattern in the first output signal and the second output signal, and set a delay of at least one of the first interface unit and the second interface as a function of the combined pattern.

12. The IC chip of claim 11, wherein the delay controller is configured to determine a combined switch pattern in the first output signal and the second output signal.

13. The IC chip of claim 11, wherein the delay controller is configured to receive a coupling characteristic indicative of one of a mutual inductive coupling characteristic and a mutual capacitive coupling characteristic.

14. The IC chip of claim 13, wherein the delay controller is configured to set the delay as a function of the combined pattern and a coupling characteristic of the first transmission line and the second transmission line.

15. The IC chip of claim 13, wherein the delay controller is configured to detect the combined pattern that the coupling characteristic of the first transmission line and the second transmission line causes a timing change of the combined pattern.

16. The IC chip of claim 15, wherein the delay controller is configured to set the delay for transmitting the combined pattern to compensate for the timing change.

17. The IC chip of claim 11, wherein
the first interface unit comprises a first tunable delay element;
the second interface unit comprises a second tunable delay element; and
the delay controller is configured to control the first tunable delay element and the second tunable delay element.

18. The IC chip of claim 11, wherein the internal circuits comprise:
a data flow circuit configured to generate the first output signal and the second output signal based on the data for output.

19. The IC chip of claim 11, wherein the delay controller is configured to track the first output signal and the second output signal, detect a first pattern of the first output signal and a second pattern of the second output signal, and determine a combined pattern defined by a combination of the first pattern and the second pattern.

20. The IC chip of claim 11, wherein at least a portion of the first transmission line is adjacent to the second transmission line.

* * * * *